United States Patent [19]
Quinn

[11] 3,923,147
[45] Dec. 2, 1975

[54] SYNCHRONIZED STACKING SYSTEM
[75] Inventor: Richard M. Quinn, Muncie, Ind.
[73] Assignee: Ball Corporation, Muncie, Ind.
[22] Filed: Feb. 15, 1973
[21] Appl. No.: 351,404

Related U.S. Application Data
[62] Division of Ser. No. 117,586, Feb. 22, 1971, Pat. No. 3,762,907.

[52] U.S. Cl. .................. 198/40; 198/19; 318/85
[51] Int. Cl. ............................................. B65g 43/00
[58] Field of Search .......... 198/40, 19, 29; 271/57; 318/85; 235/151.1, 151.11

[56] References Cited
UNITED STATES PATENTS
2,985,277  5/1961  Prellwitz .................. 198/40 X
3,113,404  12/1963  Narel et al. .................. 198/19

Primary Examiner—Evon C. Blunk
Assistant Examiner—Douglas D. Watts
Attorney, Agent, or Firm—James D. Haynes

[57]  ABSTRACT

A synchronized stacking system for use with a glass forming machine, said system comprising means for grouping ware, means for providing electrical pulses indicative of the stage of operation of the glass forming machine and means for counting the electrical pulses in timed relationship to the ware stacking means whereby a desired grouping of ware on an associated conveyor is effected.

5 Claims, 4 Drawing Figures

SYNCHRONIZED STACKING SYSTEM

This application is a divisional of our copending application Ser. No. 117,586, filed Feb. 22, 1971, (now U.S. Pat. No. 3,762,907) and entitled "A Glass Forming Machine Having An Automatic Control System".

BACKGROUND OF THE INVENTION

1. Field of the Invention

This invention pertains generally to machines for forming hollow glass articles from molten glass, and more particularly to an electronically controlled stacking system for glass articles.

2. Discussion of Prior Art

The formation of hollow glass articles from a supply of molten glass is an ancient art. In modern times, it has become customary to form glassware by machine, in contrast to the slower and less efficient process of forming such articles by hand. The development of such machines made possible the mass production of glass articles, especially as improvements in and modifications of such mechanized systems as were realized.

The rapidly produced glassware leaving a glass forming machine is placed on a conveyor for transferal through other stages to the final steps of production, e.g., application of various coatings to the glassware or annealing of the glassware. In order to arrange the glassware for orderly processing, various mechanical devices (stackers) have been developed which align the glassware in rows on a conveyor. One such stacker would be the Push-Bar Stacker manufactured by Ball Corporation, Muncie, Indiana.

The stacker has traditionally been mechanically controlled as a slave to the glass forming machine. Essentially the main shaft of the glass forming machine is geared to produce a signal at predetermined intervals. These signals activate the stacker to cause the stacker to react to arrange the glassware on a conveyor. The timing or synchronizing of the function of the stacker to the glass forming machine and effective operation of the stacker to cause uniform numbers of glassware to be arranged in rows across a conveyor has been very difficult. This results in loss of production efficiency since the speed of the glass forming machine is ultimately no faster than the effective processing rate of the stacker.

SUMMARY OF THE INVENTION

Accordingly, it is an object of the present invention to provide a synchronized stacking system including an electronic timing and synchronizing control system.

Another object of the invention is to provide a means for controlling a machine maching in which the sequence of events constituting the various steps of stacking are controlled and maintained with a degree of accuracy heretofore unobtainable.

BRIEF DESCRIPTION OF THE DRAWINGS

With the above considerations and objects in mind, the invention itself will now be described in connection with a preferred embodiment thereof, given by way of example and not of limitation, and with reference to the accompanying drawings, in which.

DETAILED DESCRIPTION

Figure 1A:
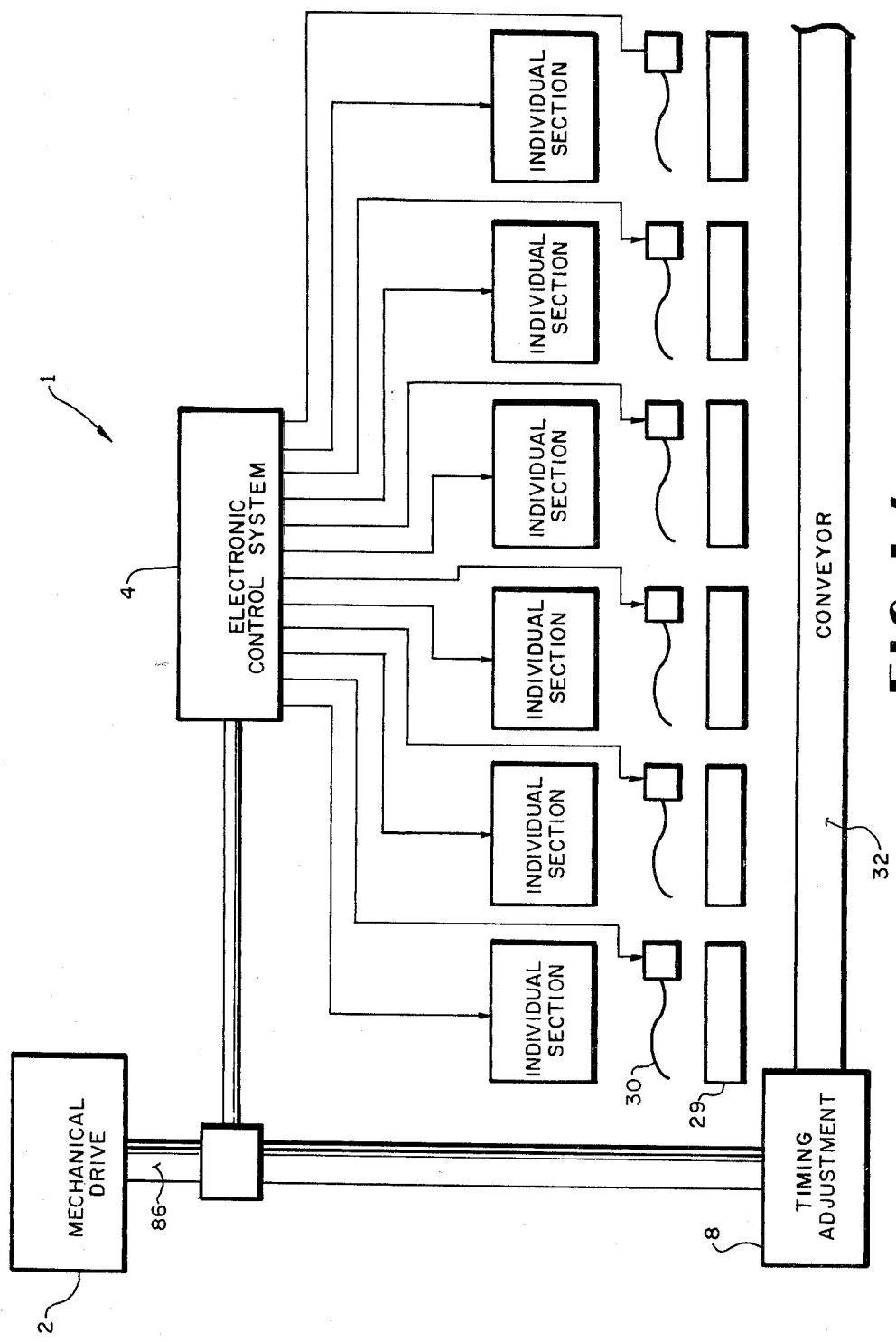
FIG. 1A is a block schematic diagram of a glass forming machine having a plurality of forming sections controlled by a centralized electronic control system assembly.

Referring now to the drawings, wherein like components are designated by like reference numerals throughout the various figures, a glass forming machine 1, constructed in accordance with the present invention is functionally illustrated in FIG. 1A and includes a plurality of identical sections 10 (six as shown by way of example in FIG. 1A).

As indicated in FIG. 1A, a conveyor belt 32 is normally associated with a glass forming machine to carry ware from the machine to a stacker after formation. Commonly, such a conveyor is mechanically driven by conveyor mechanism drive 2 through a rotatable shaft 86 and a timing adjustment mechanism 8, all of which may be conventional. This drive system may be utilized by electronic control system 4 to achieve overall operational coordination by having the electronic control system sense rotation of drive shaft 86 and then utilizing this information for timing within the system, this being more particularly achieved by use of pulse generators within the system.

The electronic control system controls operation of all of the individual sections of the glass forming machine by timewise coordinating this system with the mechanical drive associated equipment, such as, for example, conveyor 32, to thereby achieve overall operational timing. By way of further example of mechanical control, pusher arms 30, which are indicated in FIG. 1A as being controlled by electronic control system 4 to move ware from dead plate 29 to conveyor 32, could also be mechanically controlled by connection with timing adjustment mechanism 8 if desired.

Thus, as is functionally shown in FIG. 1A the electronic control system 4 is coordinated to overall operational timing so that the production of ware will be coordinated in the entire manufacturing process. This control includes not only control of shearing of glass gobs to be delivered to the glass forming machine, but also controls each step of forming the ware and then transferring the formed ware for subsequent processing.

Figure 1B:
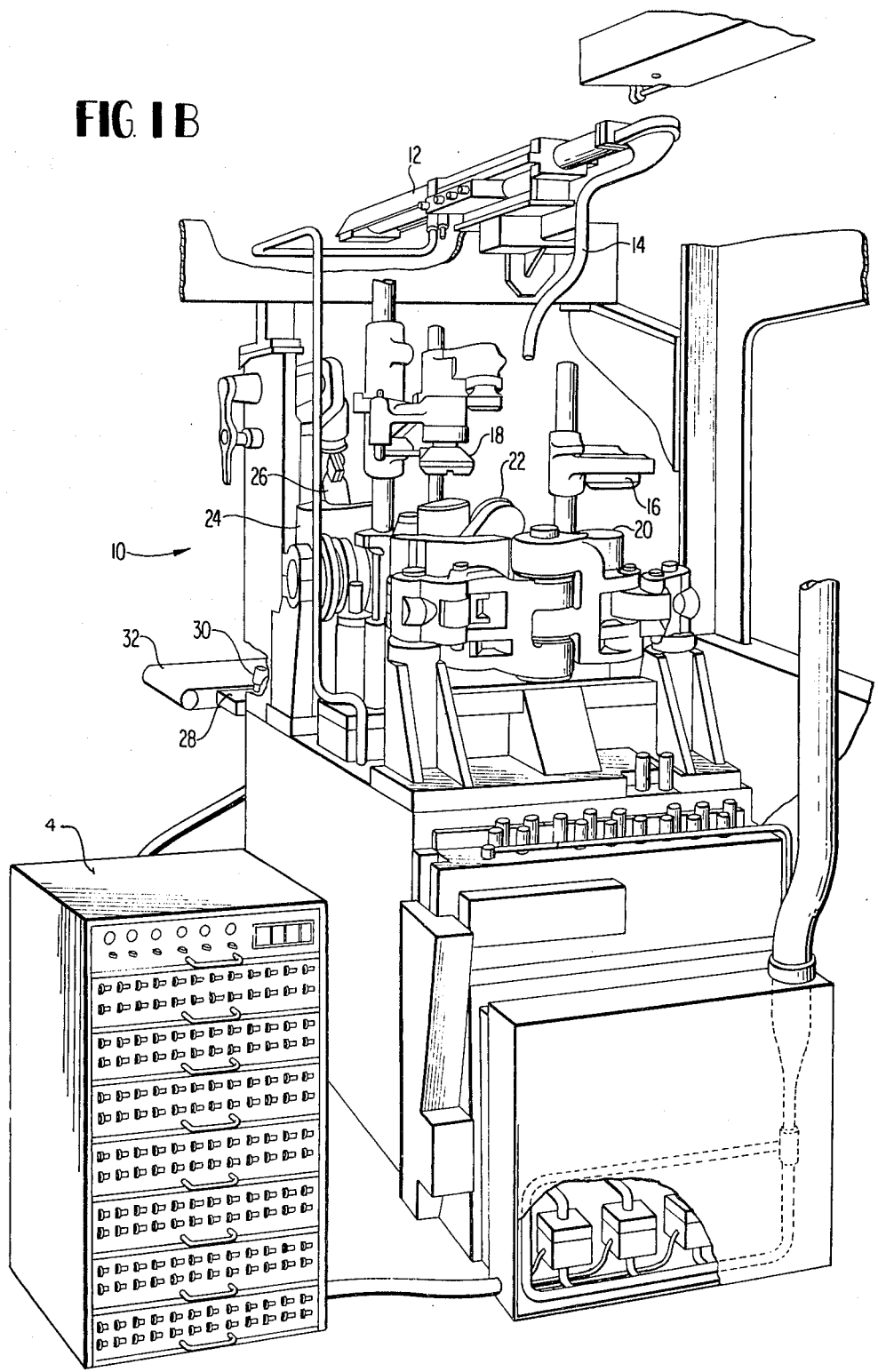
FIG. 1B is a perspective view, with portions being broken away for clarity, of one section of the glass forming machine illustrated in block form in FIG. 1A, and including the conveyer along which glassware proceeds toward the stacker.

Referring now specifically to FIG. 1B, an individual section of an exemplary glass forming machine of the individual section type is shown in perspective, with portions broken away for clarity. It is to be understood that the glass forming machine as shown, however, is merely representative of the type of machine to which the present invention is applicable, since the particular details of the stacking machine and the control system adapted thereto may be varied to suit the needs of a given installation.

As illustrated in FIG. 1B, one of the sections 10 of a blow-and-blow machine is shown from the back side or blank mold side, displaying such elements as scoop 12, delivery means 14 and both funnel 16 and baffle 18 associated with blank mold 20. A transfer or invert mechanism 22 is positioned intermediate the front and back sides of the machine, for inverting the parison formed in the blank mold 20 while transferring it to a blow mold 24 at the front of the section. A suitable takeout mechanism 26 is positioned near blow mold 24 for removal of the hot finished ware therefrom and transferred to a corresponding dead plate 28. Also, on the front side of the machine is pushout mechanism or pusher arm 30 for delivering the ware from the dead plate 28 to conveyor means 32, which, as stated above, will normally serve to transport the ware for further processing, as, for example, to a stacker and onto a lehr (not shown) for annealing and subsequent cooling and any other desired treatment (such as a lubricant coating).

An additional function related to the operation of the individual section machine, a function which forms an integral part of the overall operation thereof, is the stacker 421 (FIG. 2), by means of which ware proceeding down the conveyor from the several sections of the machine are arranged in a desired orderly manner for passing through the lehr. That is to say, some means must be provided to place the ware in sequential rows, each row including a predetermined number of bottles, jars or other ware being produced by the machine, for orderly passage through the lehr in order to assure proper treatment of the ware in the lehr, as well as to assure efficient use of the lehr. The means for accomplishing this desired marshalling of the ware on the conveyor usually comprises an apparatus referred to as a stacker. Stacker mechanisms are well known in the art, and no detailed reference is made thereto here, except as to the fact that means are included to provide the desired number of ware in each of a plurality of rows across the conveyor as the latter approaches the lehr, downstream of the individual section machine. It is known to utilize stacker mechanisms which are driven and controlled by valve action, more specifically solenoid hydraulic valve action, and it is to the means of controlling such solenoid-operated hydraulic valves that the presently-described portion of the instant invention is directed.

Figure 2:
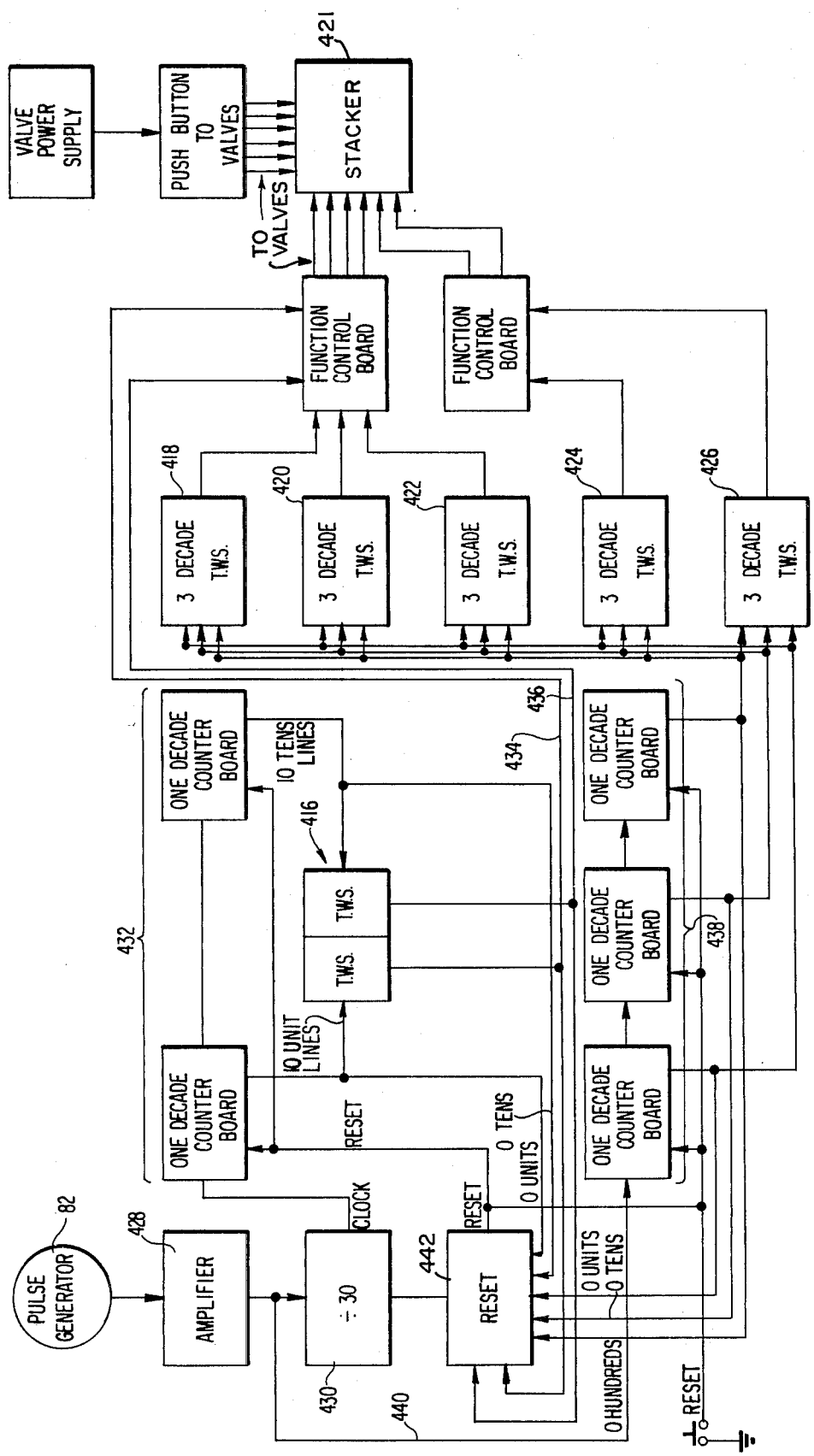
FIG. 2 is a block diagram of a preferred embodiment of the stacker controller circuitry of the present invention.

The preferred embodiment of the stacker controller means of the present invention is shown in block diagram form in FIG. 2, and as may be seen therein, the six stacker controller functions (3 "on" and 3 "off") of the preferred emobidiment are operated in accordance with the settings of six thumbwheel switches. One of these switches is a two-decade switch, as indicated at 416, and the other five are three-decade switches, shown at 418, 420, 422, 424 and 426 in FIG. 2. Two-decade switch 416 is set at a two-digit number equaling the number of ware articles in each row passing through the lehr.

Referring to the circuitry of FIG. 2 in somewhat greater detail, the signal from pulse generator 82 is first amplified in amplifier 428 and then divided by thirty in divider 430. The output of divider 430 thus represents individual ware leaving the machine, since a six-section machine running dual gob makes two bottles or other ware every sixty degrees of rotation, and in the preferred embodiment being described, each thirty degrees represents a single bottle.

The output of divider 430 constitutes a clock signal for a two-decade counter 432, the output of which, in turn, is applied to the two-decade thumbwheel switch 416. The setting on this switch thus represents the number of bottles or other ware, and the output thereof is utilized to activate the first function of the stacker, via conductors 434 and 436.

The stacker control of FIG. 2 also includes a three-decade counter 438, the clock to which is the output from the pulse generator amplifier 428, supplied by line 440. The three-decade counter 438 thus counts degrees of rotation of the individual section machine, and the five three-decade switches 418 through 426 are connected to counter 438 to drive the remaining five functions of the stacker mechanism.

If it be assumed that it is desired to have the ware pass through the lehr twelve abreast, the two-decade thumbwheel switch 416 would be set to the number "12". When the two-decade counter 432 counts to that number, the output of thumbwheel switch 416 triggers a function control circuit to turn on a respective valve in the stacker mechanism. At the same time, the output of thumbwheel switch 416 resets both the two-decade counter 432 and the three-decade counter 438.

Figure 3:
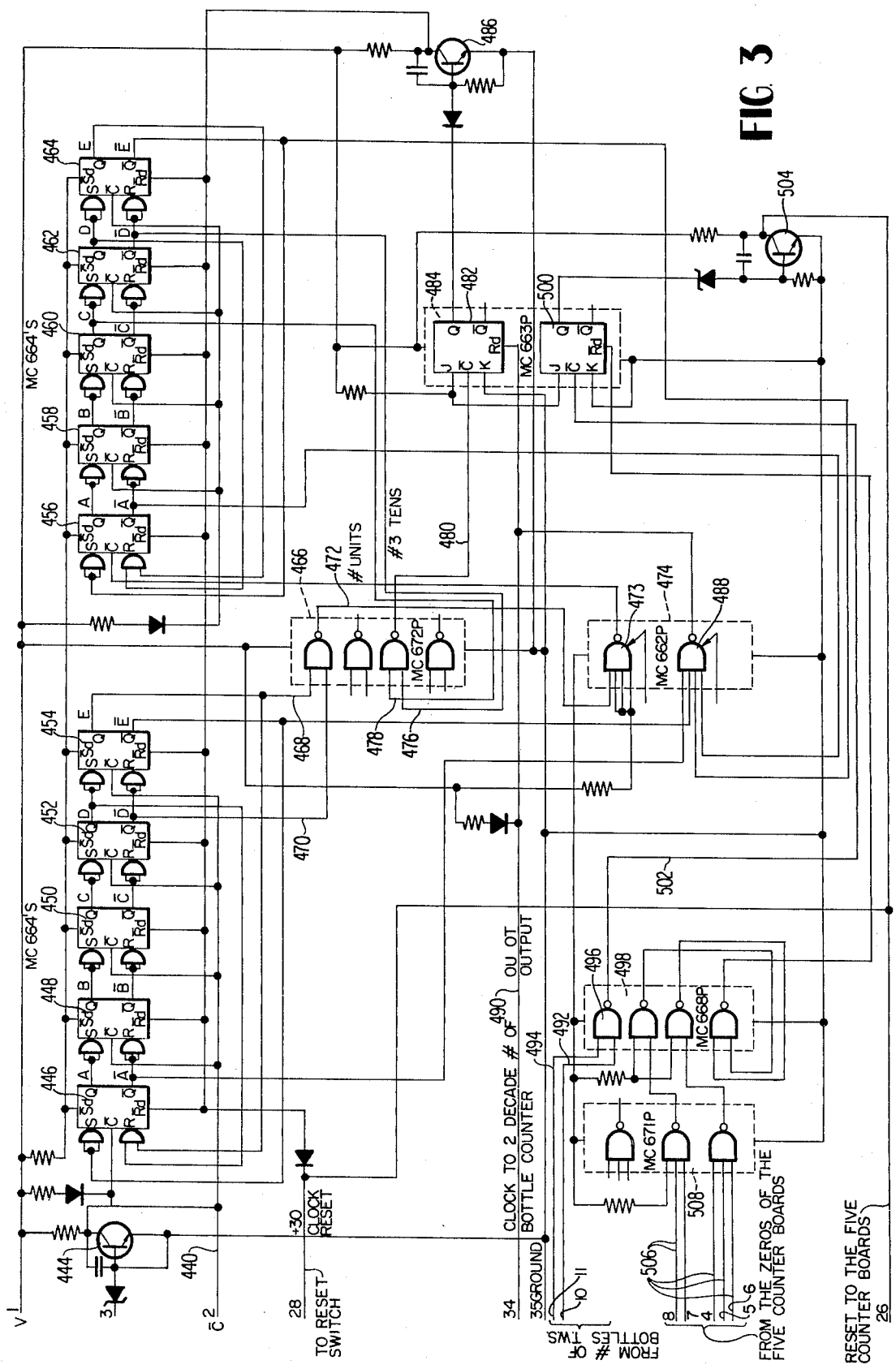
FIG. 3 is a schematic diagram of the primary circuitry of the stacker controller shown in FIG. 2.

FIG. 3 constitutes the circuitry of a circuit board which includes amplifier 428, divider 430 and reset circuit 442 of FIG. 2, and as such, this circuitry generates the clock signal for the two-decade counter 432 and gates all of the resets simultaneously to ensure proper operation.

The signal from pulse generator 82 is amplified by transistor 444 and passed to integrated circuit 446, the first stage of a two-decade counter comprising integrated circuits 446 through 464 and used to generate the divide-by-thirty signal. The output of transistor 444 also is applied by line 440 to the three-decade counter 438 of FIG. 2.

The number 9 units are decoded by a gate of integrated circuit 466, the inputs to which are at lines 468 and 470, with the output at line 472. Upon inversion by a gate 473 of integrated circuit 474, this signal becomes the clock to the second decade of the two-decade counter.

The number 3 tens are gates in integrated circuit 462 at 476 and 478, and out at 480 as a clock to flip-flop 482 of integrated circuit 484. When flip-flop 482 is thus clocked, the Q output goes high, saturating transistor 486, resetting both decades. This clocking of flip-flop 482 signifies the attainment of a count of thirty.

The zero tens output and the zero units are decoded by the remaining gate 488 of integrated circuit 474, resetting the flip-flop 482, this reset signal also constituting the clock to the two-decade counter 432, via line 490. The counter comprising integrated circuits 446 through 464 thus counts up to thirty, and is then reset to zero with line 490 going low for one clock pulse, putting a one count into the the two-decade counter 432.

When two-decade counter 432 reaches the number of the setting on thumbwheel switch 416, lines 492 and 494 connected thereto go high. As a result, the output of gate 496 of integrated circuit 498 goes low, clocking the remaining flip-flop 500 of integrated circuit 484, via line 502. The Q output of flip-flop 500 goes high, saturating transistor 504 and resetting all five decades of the counters. At this point, lines 506 go high, and by way of the several gates of integrated circuits 508 and 498, reset flip-flop 500.

Further, obvious variations in the other details shown in the specific embodiment may be made in achieving an automatic control system in accordance with the present invention. In addition, those components which are not shown in detail or which are not numbered or described are conventional components, a description, therefore, not being necessary. Hence, the invention is not to be considered as being limited to the particular details given, nor to the specific application to which reference has been made during the description of the control system disclosed, except insofar as may be required by the scope of the appended claims.

What is claimed is:

1. A synchronized stacking system for use with a glassware forming machine having a plurality of sections each of which repetitively performs a sequence of steps in the formation of rigid glassware articles, said synchronized stacking system comprising ware grouping means, means for providing electrical pulses indicative of the stage of operation of said machine, and means for counting said electrical pulses in timed relationship to said ware stacking means whereby a desire grouping of ware on an associated conveyor is effected.

2. A synchronized stacking system in accordance with claim 1 wherein said means for counting electrical pulses includes electronic counter circuitry.

3. Means for controlling a stacking system whereby ware leaving a work station is grouped and transferred onto a conveyor, said means comprising:
   means for generating clock pulses indicative of the number of ware leaving said work station;
   means for generating an output signal when a preselected number of clock pulses have been generated; and
   means for sensing the degrees of rotation of a rotating shaft of said work station and providing an output signal at various preselected degrees of rotation.

4. A synchronized stacking system comprising a conveyor and a stacking means for simultaneously transferring a plurality of articles from said conveyor, said stacking means being responsive to control circuitry comprising:
   means for generating clock pulses indicative of the number of said articles;
   means for generating an output signal when a preselected number of clock pulses have been generated; and
   means for sensing the degrees of rotation of a rotating shaft of a work station producing said articles and producing an output signal at various preselected degrees of rotation.

5. A synchronized stacking system in combination with a glassware forming machine, said stacking system effecting transfer of plurality of articles from a conveyor and comprising:
   means for generating an output signal when a preselected number of articles have been conveyed to a preselected location;
   means for generating repetitive signals indicative of the number of articles proceeding along a conveyor, said means for generating repetitive signals indicative of the number of articles comprising a pulse generator and a divider; and
   means providing output signals representative of the degrees of rotation of the control drum of said glass forming machine.

* * * * *

UNITED STATES PATENT OFFICE
CERTIFICATE OF CORRECTION

Patent No. 3,923,147          Dated December 2, 1975

Inventor(s) Richard M. Quinn

It is certified that error appears in the above-identified patent and that said Letters Patent are hereby corrected as shown below:

Column 1, line 54, "machine maching" should be "stacking machine".

Column 4, line 39, "gates" should be "gated".
Column 5, line 17, "desire" should be "desired".

Signed and Sealed this

Fourteenth Day of September 1976

[SEAL]

Attest:

RUTH C. MASON
*Attesting Officer*

C. MARSHALL DANN
*Commissioner of Patents and Trademarks*